US007535542B2

(12) United States Patent
Ueda

(10) Patent No.: US 7,535,542 B2
(45) Date of Patent: May 19, 2009

(54) INFORMATION DISPLAY SHEET

(75) Inventor: Hideaki Ueda, Kishiwada (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 616 days.

(21) Appl. No.: 11/260,131

(22) Filed: Oct. 27, 2005

(65) Prior Publication Data

US 2006/0152536 A1 Jul. 13, 2006

(30) Foreign Application Priority Data

Jan. 11, 2005 (JP) ............................ 2005-003502

(51) Int. Cl.
*G02F 1/1343* (2006.01)
*G09G 3/00* (2006.01)

(52) U.S. Cl. ...................................... 349/158; 345/901

(58) Field of Classification Search ...................... None
See application file for complete search history.

(56) References Cited

U.S. PATENT DOCUMENTS 6,530,838 B2 * 3/2003 Ha et al. ...................... 463/36
7,398,151 B1 * 7/2008 Burrell et al. ............... 701/200

FOREIGN PATENT DOCUMENTS

| | | |
|---|---|---|
| JP | 10-171620 | 6/1998 |
| JP | 2001255513 | 9/2001 |
| JP | 2001255514 | 9/2001 |
| JP | 2002218036 | 8/2002 |
| JP | 2003345267 | 12/2003 |
| JP | 2004023368 | 1/2004 |

* cited by examiner

*Primary Examiner*—Tina M Wong

(57) ABSTRACT

An information display sheet includes: a transparent first substrate; a second substrate spaced away from and parallel to the transparent first substrate; a sound reproducer provided in a space formed by side edges stipulated by the transparent first substrate and the second substrate; and an information display unit provided in the space, having an information displaying section arranged facing the transparent first substrate for displaying image information.

7 Claims, 2 Drawing Sheets

INFORMATION DISPLAY SHEET

This application is based on Japanese Patent Application No. 2005-003502 filed on Jan. 11, 2005, which is incorporated hereinto by reference.

BACKGROUND OF THE INVENTION

The present invention relates to an information display sheet that can display information in an electrical method and that also can reproduce sound.

In recent years, from the point of view of protection of the global environment, there is a call for reduction of waste materials and reduction in the use of paper which is the root cause of forest destruction. Considering these circumstances, rewritable information display sheets typified by electronic paper have been proposed.

The portability of an information display sheet increases remarkably if it is possible to fold it. In Patent Document 1, the electronic paper is being constituted from a thin type plastic sheet thereby making it possible to fold it.

Patent Document 1: Japanese Unexamined Patent Application Laid Open. No. Hei 10-171620.

However, in Patent Document 1, with what structure folding has been made possible has not been disclosed. In addition, there was the problem that, in a dimly lit environment, it is difficult to recognize visually the images displayed in the information displaying section unless the information displaying section is set to high luminous intensity. In addition, in an information display sheet that is capable of reproducing sound, of course, since even the sound reproducer has the shape of a sheet, there was the problem that the sound output is small.

SUMMARY OF THE INVENTION

The present invention has been made considering the above conditions, and the purpose of the present invention is to provide an information display sheet that can be folded easily and to provide an information display sheet that can output sound information in addition to image information. Further, the purpose is to provide an information display sheet whose sound output becomes large.

The above purposes of the present invention can be achieved by anyone of the following Structures (1) through (6).

Structure (1): an information display sheet in which are arranged a transparent first substrate and a second substrate placed parallel to at a constant spacing from the first substrate, and, in the space formed by the side edges stipulated by the first substrate and second substrate, are placed a sound reproducer and an information displaying section on the side of the first substrate as an information display unit that displays image information.

Structure (2): an information display sheet described in Structure (1) with the feature that a spatial region is obtained within the space that has a surface parallel to the side edge and has a specific width, the region of the first substrate and second substrate positioned within the spatial region is made as the folding and bending section, and it is possible to fold the sheet along the spatial region.

Structure (3): an information display sheet described in Structure (2) with the feature that through-holes are provided in the region of the first substrate positioned in the spatial region.

Structure (4): an information display sheet described in Structure (3) with the feature that the sound reproducer, the spatial section formed between the first and second substrates, and the spatial region are linked together.

Structure (5): an information display sheet described in any one of the Structures (1) to (4) with a feature that the information display unit has memory characteristics by which the display state is maintained even when the power supply has been stopped.

Structure (6): an information display sheet described in Structure (5) with a feature that the information display unit has a displaying section employing cholesteric liquid crystals, or a display section employing electrophoretic particle, or a display section employing chemical compounds having electrochromic characteristics.

DETAILED DESCRIPTION OF THE PREFERRED EMBODIMENT

Figure 1:
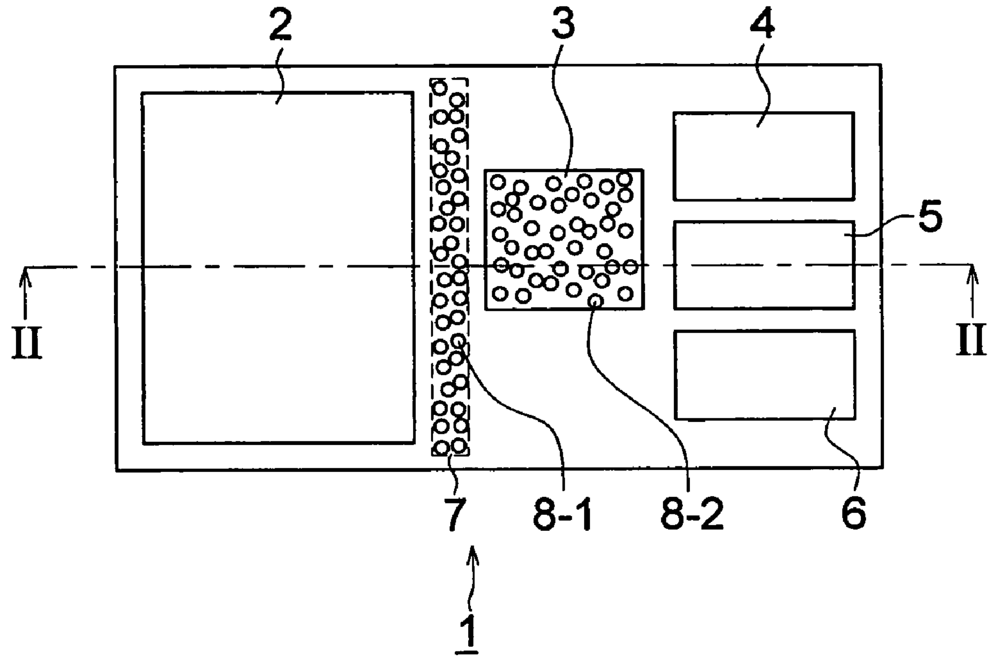
FIG. 1 is an outline plan view diagram of an information display sheet in a preferred embodiment of the present information.

In the following, a preferred embodiment of the information display sheet according to the present invention is described referring to the drawings.

Figure 2:
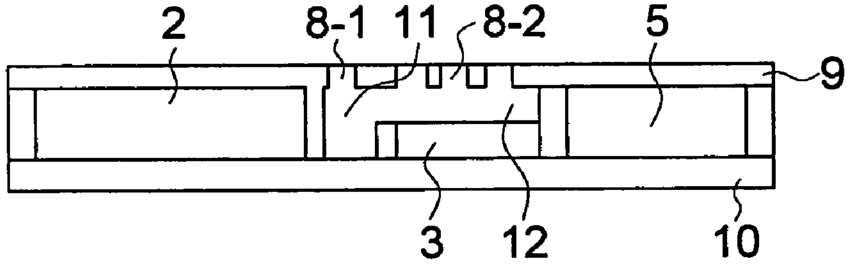
FIG. 2 is an outline cross-sectional diagram at the cross section II-II in FIG. 1 of an information display sheet in a preferred embodiment of the present information.

FIG. 1 is an outline plan view diagram of an information display sheet in a preferred embodiment of the present information, and shows the view as seen from the first substrate (indicated by the numeral 9 in FIG. 2). The information display sheet 1 is provided with an information display unit 2, a sound reproducer 3, an IC module 4 that governs storage and different controls of the sound information and image information, a battery 5, an operation section 6 having various types of operation buttons, a folding section 7 that is provided in the first substrate (indicated by the numeral 9 in FIG. 2) and that makes it possible to fold the information display sheet 1, holes 8-1 that pierce through the first substrate 9 formed in the folding section 7, and holes 8-2 form in the first substrate 9 for efficiently taking out to the outside the reproduced sound from the sound reproducer 3.

The information display unit 2 has the information displaying section that displays the image information and that is placed facing the first substrate 9. Therefore, it is absolutely essential that the first substrate 9 is transparent, and the image information is viewed in the direction from the first substrate 9. Here, the sound reproducer 3 is that having both a speaker with sound output function and a microphone with sound input function. It is possible to use any item that is generally used in the field of information display medium as the IC module 4.

It is preferable to use a thin battery for the battery 5.

FIG. 2 is an outline cross-sectional diagram at the cross section II-II in FIG. 1 of an information display sheet in a preferred embodiment of the present information, in the space formed by the side edges stipulated by the first substrate 9 and the second substrate 10 and the first substrate 9 and the second substrate 10, are placed an information display unit 2, a sound reproducer 3, an IC module 4 (not shown in FIG. 2 because it is placed on the rear side of the battery 5), and the battery 5. It is preferable that the height of the space formed by the side edges stipulated by the first substrate 9 and the second substrate 10 and the first substrate 9 and the second substrate 10 is about 1 to 1.5 mm from the point of view of portability. In addition, within this space, the spatial. region 11 having a surface parallel to the side edge and a specific width has been acquired. In order to make the information display sheet foldable along this spatial region 11, the position (not shown in the figure) of the second substrate opposite the folding section 7 of the first substrate 9 is made a folding and bending section.

In this spatial region 11, it is not possible to place components that obstruct folding at the time of folding the information display sheet 1. In other words, in the present invention, this implies that components that obstruct folding at the time of folding the information display sheet 1 are not placed in the spatial region. Therefore, for example, it is possible to place in this spatial region 11 wiring components that can be folded such as a flexible printed circuit board.

In addition, the spatial region 11 is linked with the space section 12 formed between the sound reproducer 3 and the first substrate, and the structure is such that a plurality of holes 8-1 are provided that pierce through the region of the first substrate 9 positioned in the spatial region 11. By having such a structure, it is possible to take out efficiently to the outside the sound generated from the sound reproducer 3, and it is possible to reproduce sound with a larger volume.

If it is perceived that it is very important from the point of view of portability to fold the information display sheet 1, it is preferable that the thickness of the substrate, along with the first substrate 9 and the second substrate 10 is 100 to 500 μm. Further, as the material for the substrate, it is possible to use PET (polyethylene terephthalate), PC (polycarbonate), PE (polyethylene), and PES (polyether sulfone), etc. Although it is absolutely essential that the first substrate 9 is transparent, the second substrate 10 can be transparent or can be opaque.

Firstly, the case is described when a cholesteric liquid crystal is used for the information display unit 2.

A liquid crystal display device using cholesteric liquid crystals in the information display unit 2 is composed of basically a pair of substrates having transparent electrodes and a liquid crystal layer held between these substrates. The orientation of the liquid crystal molecules in this liquid crystal layer is controlled by applying a specific drive voltage to this liquid crystal layer, and the desired image is displayed by modulating the external light that incident on the liquid crystal display device. In addition, the liquid crystal display device may have space retention members placed between the two substrates in order to maintain the spacing between the two substrates. In specific terms, a liquid crystal material exhibiting the cholesteric phase is held between a pair of substrates, and the display is made by switching the state of the liquid crystals between the planar state and the focal conic state. When the liquid crystal is in the planar state, denoting the screw pitch of the cholesteric liquid crystal by P and the average refractive index of the liquid crystal by n, the light with a wavelength of $\lambda=P \cdot n$ is reflected selectively. Also, in the focal conic state, the light gets dispersed if the selective reflection wavelength of the cholesteric liquid crystal is in the infrared region, and the liquid crystal allows the light to pass through it if the wavelength of light is shorter. Therefore, by setting the selective reflection wavelength in the visible light region and providing a light absorption layer (for example, a black colored layer) on the side opposite to the viewing side of the device, it is possible to display the selective reflection color in the planar state and to display black color in the focal conic state. Further, by setting the selective reflection wavelength in the infrared region and providing a light absorption layer on the side opposite to the viewing side of the device, it is possible to display in black color in the planar state because although light with a wavelength in the infrared region is reflected light in the visible region is passed through, and it is possible to display in white color due to dispersion in the focal conic state.

When forming an information display unit 2 using cholesteric liquid crystals according to the present invention, the cholesteric liquid crystal can be inserted in a microcapsule, if necessary it is also possible to place it along with binder resin between the electrodes, and the formation can be done by dispersing the cholesteric liquid crystal along with the binder resin. In addition, it is also possible to form the liquid crystal layer as a film with strength using an optically hardening resin thereby causing phase separation during polymerization (polymerization phase separation).

Next, the case is described of using microcapsule type electrophoretic particles for the information display unit 2.

In an information display unit 2 using microcapsule type electrophoretic particles, text characters, numerals, and figures are written by applying a voltage to pass current through it. Also, the displayed information is erased by applying a reverse electrical field.

A display device using microcapsule type electrophoretic particles employed in the present invention is one formed by inserting between the electrodes microcapsules in which is enclosed a dispersion system made by dispersing electrophoretic particles in a dispersing medium. When an electric field is applied to the microcapsule in which a dispersing medium colored with a specific coloring agent and white electrophoretic particles are enclosed, in the case when the white particles get negatively charged and when the first electrode is the anode, the white particles the white particles move towards the first electrode side, and the displayed color will be that of the dispersing medium. On the other hand, when the first electrode is the cathode, the white particles move towards the second electrode and the displayed color will be white. It is also possible to carry out the display using colored particles and white particles in a transparent medium.

As a colored dispersion medium, it is possible to use, for example, aliphatic hydrocarbons, aromatic hydrocarbons, halogenated hydrocarbons, various types of esters, alcohols, or other different types of oils that are used either alone or mixed appropriately to form a solvent, and the coloring is done using a publicly known azoic dyes, anthraquinone dyes, triphenylamine dyes, and metallic dyes, etc., either alone or mixed appropriately.

For the white particles, it is possible to use, for example, apart from inorganic pigments such as titanium oxide or zinc oxide, zinc sulfide, etc., powder of glass or resins, etc., are compounds of these. Depending on the need, by treating the surfaces of the particles using various types of surfactants, dispersing agents, organic or inorganic compounds, metal compounds, etc., it is not only possible to give the desired surface charges but also to improve the dispersibility in the dispersing medium.

The dispersed liquid is enclosed in microcapsules manufactured using different methods of phase separation methods such as the compound coacervation method, interfacial polymerization, in-situ method, solvent dispersion and cooling method, etc. Depending on the need, the distribution of the diameter of the prepared microcapsules is controlled using an optional method such as the specific weight separation method. It is preferable that the diameter of the microcapsules is in the range 1 to 300 μm, and still more preferably in the range 5 to 200 μm.

It is possible to form a reversible information displaying layer by coating the obtained microcapsule particles along with an appropriate binder resin on the electrodes. It is also possible to mix spaces in the displaying layer in order to control the thickness of the film. The usable spaces are spherical-shaped or plate-shaped fine particles of resins or inorganic particles commonly sold in the market for liquid crystal panels.

Further, the case is described of using an electrochromic material for the information display unit 2.

An information display unit 2 using an electrochromic material is one that carries out display because of the material getting colored due to dissolution or deposition, or because of the color of the material changing due to changes in the structure of the material upon application of a voltage, and hence, text characters, numerals, and figures are written by applying a voltage to pass current through it, while the displayed information is erased by applying a reverse electrical field.

The electrochromic display device used in the present invention includes display devices of the electrodeposition type. An electrodeposition type of device is one in which an electrolytic layer is held between two electrodes, and the display is made due to the metallic ions included in the electrolytic layer being precipitated or dissolved by electrochemical reaction upon the application of a voltage between the electrodes.

The electrochromic display device used preferably in the present invention is one in which an electrolytic layer is formed between transparent supporting bodies on which are formed transparent pixel electrodes, such electrolytic layer having electrical activity and also includes a layer of a material whose color changes due to electrochemical oxidization or reduction and a coloring agent, or, is an electrochromic display device in which an electrolytic layer is formed that has metal ions and coloring agents. From the point of view of durability, it is preferable to use a polymer for the color changing material, and from the point of view of durability and ease of manufacture it is preferable to use a polymer electrolyte or an ionic liquid as the electrolytic layer.

The material used as the electrochromic material can be a viologen derivative, tungsten oxide, lithium doped tungsten oxide, erbium phthalocyanine derivative, or a polymeric material such as polypyrrole, polyaniline, polyazulene, polythiophene, polyindole, polycarbazole, etc.

The polymers used in polymeric electrolytes can be polyethylene oxide, polypropylene oxide, polyethylene imine, and polyethylene sulfide the skeleton units of which are represented respectively by $—(C—C—O)_n—$, $—(C—C—(CH_3)—O)_n—$, $—(C—C—N)_n—$, and $—(C—C—S)_n$. It is also possible to have these as the main chain structure and there can be branches also. In addition, it is also preferable to use polymethylmethacrylate, polyfluorovinylidene, polychlorovinylidene, polycarbonate, etc.

At the time of forming polymer solid electrolytes, it is preferable to add a plasticizer. The preferable plasticizer is, when the polymer used is hydrophilic, water, ethyl alcohol, isopropyl alcohol, and their mixtures, and when the polymer used is hydrophobic, the preferable plasticizer is propylene carbonate, dimethyl carbonate, ethylene carbonate, γ-bromolactone, acetonitrile, sulfone, dimethoxyethane dimethyl formamide, dimethyl acetoamide, n-methyl pyrrolidone, and their mixtures.

Although polymeric electrolyte is formed by dissolving an electrolyte in the polymers, such an electrolyte can be a lithium salt such as LiCl, LiBr, $LiBF_4$, $LiClO_4$, $LiPF_6$, or $LiCF_3SO_3$, or a potassium salt such as KCl, KBr, or KI, or a sodium salt such as NaCl, NaBr, or NaI, etc., or tetra-alkyl ammonium salts, for example, boron tetrabutyl ammonium fluoride, tetrabutyl ammonium perchlorate, tetrabutyl ammonium halide, etc. Also, it is satisfactory even if the alkyl chain length of the above ammonium salts is not uniform.

In order to increase the contrast, the polymeric electrolyte layer can also include coloring agents. When the coloring agent is black, a white material with high masking ability is introduced as background color. White granules for pigmentation are used in such a material and it is possible to use, for example, titanium dioxide, calcium carbonate, zinc oxide, magnesium oxide, barium sulfide, aluminum oxide, etc. Further, it is also possible to use dyes for pigmentation.

In the case of appearance and disappearance of color due to electrochemical precipitation and dissolution of metal, it is possible to use as the metallic ions, the ions of the metals bismuth, tin, silver, lithium, iron, chromium, nickel, and zinc or their combinations. In particular, the preferable metallic ions are silver and bismuth. This is because it is possible to promote easily the reversible reaction, and because the degree of change in color at the time of precipitation is high.

In addition, in the present invention, it is also possible to provide a protective layer on top of the displaying layer in the information display unit 2. Because of this protective layer, the displaying layer is protected mechanically or chemically from external influences.

As the material usable for the protective layer, it is possible to form a coated film by coating a solution of polymer resin, or else a resin film can be laminated. In addition, the protective layer can be formed by evaporating an inorganic material, or an inorganic material can be coated by the sol-gel method.

Furthermore, in the information display sheet according to the present invention, it is possible to make a part of the displaying layer as a non-reversible information displaying region and to write in advance some specific information in this region. For example, by writing the company name or decorative figures, it is possible to use the displaying sheet as a sheet with a specific format.

Further, in the information display sheet according to the present invention, it is also possible to provide a recording and displaying area by making a part of the displaying layer writable with a writing instrument, so that signature or specific information can be written by the individual in this area. For example, it is possible to use this region for entering name or address.

In addition, in the information display sheet according to the present invention, it is also possible to provide in a part of the displaying layer a hologram formed layer or a diffraction grating formed layer and to write in advance some specific information in this region. Such a hologram layer is one in which surface depression and protrusion patterns are formed that can reproduce 2-dimensional or 3-dimensional images. This is because, since information has been recorded in the surface depressions and protrusions, the hologram and diffraction grating is reproduced by providing a reflective layer in this depression and protrusion section. For example, by recording beforehand specific figures or letters, it is possible to make it difficult to counterfeit the information display sheet.

If, for example, the information display sheet according to the present invention is a card for medical purposes, it is possible to display in the information display unit 2, the date of appointment with the hospital or the doctor in charge, the number of appointments with the doctor, etc., so that such information can be ascertained by the user at a single glance. On the other hand, if either speech information has already been recorded in the recording section, or the announcements from the hospital or the audible version of the contents of the display is reproduced from the sound reproducing section capable of recording, the user can get such information in the form of audible speech information. Further, it is also possible to have a configuration with which, by passing the information display sheet according to the present invention through a special reader-cum-writer, it is possible to write image information and speech information, a part of which is displayed and reproduced as speech.

EXAMPLE

The information display sheet according to the present invention and a system employing such an information display sheet are explained in the following with reference to the attached drawings. Further, in each of the preferred embodiments shown below, although the explanations are made giving concrete names of materials, these are mere examples of implementation and the present invention shall not be construed to be limited to these materials and also it is possible to use various materials.

The information display sheet according to the present invention is explained based on FIG. 1. The information display sheet 1 uses a PES (polyethersulfone) film as the second substrate 10, on top of which are placed respectively the information display unit 2, the sound reproducer 3, the IC module 4, the battery 5, and the operation section 6, and the necessary electrical circuits are formed directly on the substrate. Further, a PES (polyethersulfone) film is used as the first substrate 9, and the necessary electrical circuits are formed directly on the substrate.

Further, as the folding section 7, the spatial region 11 is formed as is shown in FIG. 2, and this information display sheet has been made easy to be folded along this spatial region 11. Further, the spatial region 11 and the space section 12 above the sound reproducer 3 are communicated with each other, and fine holes are formed in the first substrate 9 corresponding to the sound reproducer 3 and the spatial region 11, and hence the construction is such that it is easy for the sound to be output from the sound reproducer 3. Also, the thickness of this information display sheet is made 1.5 mm.

At this time, since flexible PES (polyethersulfone) films are used for the first substrate 9 and the second substrate 10, it is possible to fold easily without losing the electrical circuits formed on them. Next, the information display unit 2 is described here. A cholesteric liquid crystal made of chiral nematic liquid crystal constituent material is used as the information display unit of the body of the information display sheet 1.

For the cholesteric liquid crystal, a chiral nematic liquid crystal constituent material was prepared by mixing 36.8% by weight of chiral material CB 15 (manufactured by Merck) with nematic liquid crystal A (dielectric constant anisotropy $\Delta\epsilon=32.4$, refractive index anisotropy $\Delta n=0.230$, nematic isotropy phase transition temperature Tni=103° C.). This chiral nematic liquid crystal constituent material showed broad selective reflection characteristics with a peak wavelength at 605 nm. Next, an orientation stabilization film AL-4552 (manufactured by JSR) with a thickness of 800 Å was formed on an ITO (Indium tin oxide) transparent electrode provided on top of the PES (polyethersulfone) film, and spacers (manufactured by Sekisui Fine Chemicals) of 6 μm diameter were dispersed on top of this. Also, an orientation stabilization film AL-4552 (manufactured by JSR) with a thickness of 800 Å was formed on an ITO (Indium tin oxide) transparent electrode provided on top of the other PES film substrate. Subsequently, walls with a specific height were formed by screen printing sealing material XN21S (manufactured by Mitsui Chemicals) in the peripheral part above the first substrate. Thereafter, the two substrates were bonded together and the sealing material was hardened. After that, a specific quantity of chiral nematic liquid crystal constituent material was injected using a vacuum injection equipment. A light absorbing film DIC579 (manufactured by Dai Nippon Ink) with a blue color peak reflection wavelength of 470 nm was provided on the back surface of this cell (the surface of the substrate opposite to the side on which light is incident), thus preparing the information display unit 2 using a cholesteric liquid crystal display device.

When the above cholesteric liquid crystal display device was driven by a specific voltage between the electrodes in order to change it to the white state (planar state) and blue state (focal conic state), it showed the white state at 45 V and the blue state at 30 V. During white display, the value of luminance reflectance Y was 23.3, chromaticity (x, y)=(0.34, 0.31), and the half-value width of the spectral reflection waveform was 110 nm, and hence was a device with satisfactory whiteness and high contrast. Further, the measurements of the Y value, chromaticity, and contrast were made using a spectrophotometric calorimeter CM3700d (manufactured by Konica Minolta) having a white light source.

Figure 3:
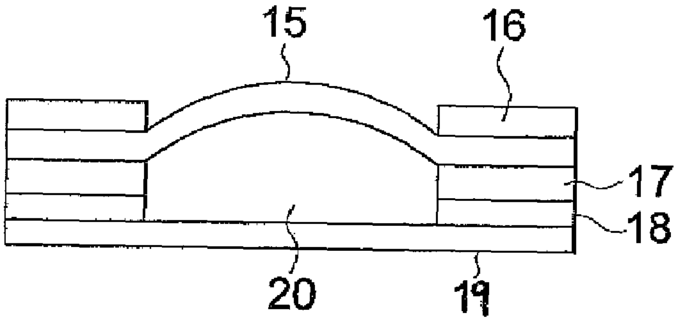
FIGS. 3(*a*) and 3(*b*) show a speaker-cum-microphone in a preferred embodiment of the present information.
Figure 3:
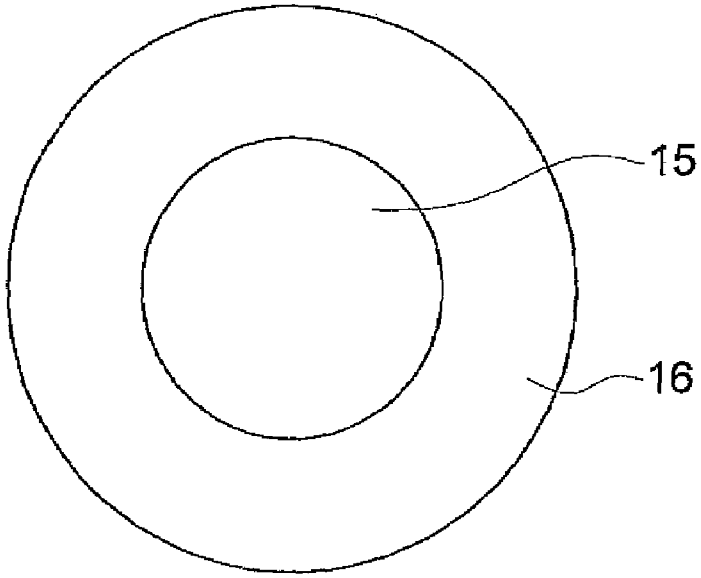

The sound reproducer 3 is shown in FIGS. 3(*a*) and 3(*b*). The periphery of the piezoelectric device film 15 made of a piezoelectric device is clasped from top and bottom by the respective first and second conductive rings 16 and 17. It is possible to apply or take out an electric voltage to or from the first conductive ring 16 and the second conductive ring 17, respectively. An insulating ring 18 is provided below the second conductive ring 17, and further below it is provided a substrate 19. The space formed by the piezoelectric device 15 and the substrate 19 is filled with urethane foam 20 that is light in weight and has elasticity. In a microphone and sound reproducer 3 of this type, when an acoustic pressure is applied from the outside to the piezoelectric device film 15, it is deformed due to the acoustic pressure, and this deformation in turn generates an induced electrical force between the front and back surfaces of the piezoelectric device film 15, and it becomes a microphone when this induced current is taken out as an electrical signal. In addition, when a voltage is applied between the first and second conductive rings 16 and 17 on the front and back surfaces of this piezoelectric device film 15, the piezoelectric device film 15 gets deformed, and when it vibrates consequently, it is possible to reproduce sound corresponding to the voltage signal applied to it. A vibrating plate is provided above this sound reproducer with a space provided between them. The vibrating plate is made of high quality bond paper coated with a PET film.

Using an information display sheet described above it is possible to fold it easily, and because the spatial region 11 of the folding section 7 and the space section 12 of the sound reproducer 3 are linked, it is possible to produce sound with a larger volume. In addition, since it is possible to transmit the information using simultaneously the information displayed in the rewriteable information display unit 2 and sound information, the information transmission is done definitely. Not only the information can be confirmed by sound even in a dimly lit environment, but also the information can be confirmed visually even when the ambient noise is large. Furthermore, by using cholesteric liquid crystals, electrophoretic particles, and electrochromic device, it is possible to carry out repeatedly erased display of images in a stable manner over a long period. Also, since the information display unit 2 displays the information upon being driven by an electric field and since the display device has memory characteristics, there is an excellent effect from the point of view of electric power consumption.

Since the information display sheet according to the present invention is provided with a rewriteable information display unit and a sound reproducer, it is possible to acquire the information definitely because not only the information can be confirmed by sound even in a dimly lit environment, but also the information can be confirmed visually even when the ambient noise is large. In addition, because the structure is such that a folding section is provided in the substrate that can be folded along the spatial region, it has become possible to fold the information display sheet easily, and hence the portability has been improved substantially. In addition, because the spatial section formed between the sound reproducer and the substrate is linked with the spatial region and since the structure is such that holes are provided that pierce through the region of the substrate positioned in the spatial region, and since it is possible to hear the reproduced sound through these holes, it is possible to reproduce sound with a larger volume.

On the other hand, as the display section of the image display unit, since a display section employing cholesteric liquid crystals with memory characteristics, or a display section employing electrophoretic particles, or a display section employing chemical compounds having electrochromic characteristics is used, it is possible to obtain an information display sheet with low power consumption.

What is claimed is:

1. An information display sheet comprising:

(a) a transparent first substrate;

(b) a second substrate spaced away from and parallel to the transparent first substrate;

(c) a sound reproducer provided in a space formed by side edges stipulated by the transparent first substrate and the second substrate; and (d) an information display unit provided in the space, having an information displaying section arranged facing the transparent first substrate for displaying image information, wherein a spatial region that has a surface parallel to the side edges and a specific width, is provided within the space, the region of the first substrate and second substrate positioned within the spatial region is made as a folding and bending section, thereby the information display sheet is capable of being folded along the spatial region.

2. The information display sheet of claim 1, wherein holes penetrating the first substrate are provided in a region of the first substrate positioned in the spatial region.

3. The information display sheet of claim 2, wherein the sound reproducer, a spatial section formed between the transparent first substrate and the second substrate, and the spatial region are linked together.

4. The information display sheet of claim 1, wherein the information display unit has memory characteristics by which a display state is maintained when a power supply has been stopped.

5. The information display sheet of claim 4, wherein the information display unit has a displaying section employing cholesteric liquid crystals, a display section employing electrophoretic particle, or a display section employing chemical compounds having electrochromic characteristics.

6. The information display sheet of claim 1, wherein a thickness of the first and second substrates is 100 to 500 μm.

7. The information display sheet of claim 1, wherein a height of a space formed by side edges stipulated by the first and second substrates, and the first and second substrates is about 1 to 1.5 mm.

* * * * *